2,829,174

BIS(HALOPENTENOXY)ALKANES

Earl W. Lane, Philadelphia, Pa., assignor to Rohm & Haas Company, Philadelphia, Pa., a corporation of Delaware No Drawing. Application July 13, 1954
Serial No. 443,152

6 Claims. (Cl. 260—615)

This invention relates to bis(halopentenoxy)alkanes as new compositions of matter. It further relates to a method for the preparation of the bis(halopentenoxy)-alkanes.

The present invention is concerned with the preparation of bis(halopentenoxy)alkanes by reacting the corresponding bis(halomethoxy)alkane with butadiene, at low temperatures, in the presence of a Friedel-Crafts catalyst. The bis(halopentenoxy)alkanes formed in this reaction may be represented by the formula

in which X is either chlorine or bromine and R is an alkylene group of two to eight carbon atoms.

The starting compounds employed in the present method, the bis(halomethoxy)alkanes, are known and are usually prepared by the halomethylation of a saturated aliphatic dihydric alcohol. Any primary or secondary saturated aliphatic dihydric alcohol of two to eight carbon atoms can be readily chloromethylated to form a satisfactory starting compound for this invention.

The present method concerns the reaction between a bis(halomethoxy)alkane and butadiene, in the ratio of one mol of the former to two mols of the latter, to form a bis(halopentenoxy)alkane having having the formula $(XCH_2CH=CHCH_2CH_2O)_2R$ defined above. Typical of the alkylene groups that may be employed as R are ethylene, propylene, butylene, pentylene, hexylene, heptylene, and octylene, including their various isomeric forms such as isopropylene, 2,3-butylene, 1,3-butylene, 2-methyl-1,3-butylene, 1,3-pentylene, 2,4-pentylene, 2,2,4-trimethyl-1,5-pentylene, and the like. The union between the oxygen atoms and the R group may occur at any two carbon atoms in the R group. The X in the formula represents chlorine or bromine. Chlorine compounds are more readily available and are relatively inexpensive. However, the bromine compounds, except from a cost standpoint, are equally desirable and frequently react faster than the corresponding chlorine compound. Hence, the choice between the chlorine or the bromine compound is largely based on cost considerations.

The reaction between butadiene and the bis(halomethoxy)alkanes is conducted at relatively low temperatures. The reaction can be satisfactorily consummated in the temperature range of —10 to 50° C., the preferred range being +10 to 40° C. Actually, the reaction occurs at temperatures above 50° C. but as the temperature progressively rises above 50° C. the danger of undesirable side reactions increases. At these higher temperatures there is the possibility that polymerization of the butadiene may occur. There is the further possibility that other rather uncontrollable side reactions may occur. In order to minimize and substantially eliminate the occurrence of reactions other than the principal one, the range of temperatures set forth above is employed in the subject method.

Atmospheric pressure is usually employed, largely as a matter of convenience. Pressures greater than atmospheric maybe advantageously used with some improvement in yields usually observed. Apparently, pressures greater than atmospheric tend to keep the butadiene in the reaction medium longer and to restrict its premature exit from the proximity of its coreactant, the bis(halomethoxy)alkane. Consequently, the elevated pressures are frequently desirable to minimize waste of the butadiene and to maximize concomitantly the yield of product.

The time of reaction is usually about one-half to four hours, although this is not critical, but frequently the reaction is continued for greater lengths of time up to about six hours in order to obtain maximum yields. Lengths of time appreciably greater than those set forth above do not usually appreciably increase the yield and do not justify the extra time and effort involved and hence are not advantageously employed.

A catalyst of the Friedel-Crafts type is necessary in order to achieve a substantial reaction. The amount of catalyst used may be varied from about 0.5 to 15%, by weight, the higher amounts generally causing higher yields, although sometimes at the highest part of the range the additional amounts of catalyst effect a minimal increase in yield. Generally, about 1 to 10%, by weight, of catalyst produces very satisfactory results and such is the preferred range. Using the above stated amounts yields up to 50% have been achieved. Typical of the individual catalysts that may be employed are zinc chloride, zinc stearate, ferric chloride, aluminum chloride, titanium tetrachloride, stannic chloride and the like, zinc chloride and zinc stearate being particularly effective for the present purposes.

The present reaction is preferably conducted in the presence of a solvent in order that the reactants be held in intimate proximity. This facilitates reaction, increases yield, and helps to minimize loss of butadiene. Suitable for this use are chloroform, ethylene dichloride, other common chlorinated solvents, acetic acid, formic acid, or the like. At the completion of the reaction the solvent is easily removed by stripping, preferably under reduced pressure.

The butadiene used in the reaction is preferably introduced into the solvent-bis(halomethoxy)alkane solution at a relatively slow rate so that a minimum of waste is experienced. Sufficient butadiene is added to assure reaction of two mols of butadiene to one mol of the bis-(halomethoxy)alkane. It is generally preferable to supply butadiene in some excess of the prescribed molar amounts in order to minimize and substantially eliminate the possibility of undesirable side reactions.

Compounds having a chemical configuration similar to that of butadiene may be employed in place of the butadiene to form similar products, although usually in reduced yields. Among the compounds that may be satisfactorily used are isoprene, cyclopentadiene and hexadiene.

At the conclusion of the reaction, after the bis(halopentenoxy)alkane has been formed, the reaction mixture is washed with water, aqueous 10% sodium carbonate, and water again. Solvent, water, and unreacted components are removed by stripping, and the product is distilled, preferably at reduced pressures down to about 0.5 mm.

The bis(halopentenoxy)alkane products of the present invention are useful as chemical intermediates to form valuable products. They react with tertiary amines to form quaternary ammonium compounds useful as bactericides. Being allylic compounds, the products of the present invention can be reacted with phenols and then subjected to the Claisen rearrangement to yield compounds useful as germicides and pesticides. The present products react with hydrogen cyanide from which can be made amines, acids, esters, and amides of value as oil additives to inhibit corrosion and to improve viscosity indexes.

The method of making the bis(halopentenoxy)alkanes according to the present invention is shown in the following illustrative examples in which parts by weight are used throughout.

*Example 1*

To a two liter, three-necked flask, equipped with a thermometer, stirrer, gas-dispersion tube, and water-cooled condenser fitted with a calcium chloride drying tube, there were added 1420 parts of bis(chloromethoxy)-ethane, 250 parts of chloroform, 14 parts of anhydrous $CaCl_2$, and 100 parts of anhydrous zinc chloride. To this mixture there was added over a period of about five hours a total of 830 parts of butadiene. During the butadiene addition the temperature of the system was maintained at 10 to 25° C. The mixture was then stirred for one hour at 20 to 25° C. At the end of that time the mixture was washed twice with water, twice with aqueous 10% sodium carbonate, and once more with water. The washing operations were aided by stirring, which consumed a total time of about six hours. The product was dried over anhydrous magnesium sulfate and then filtered. The product was distilled to remove solvent, unused starting material, and water and yielded 982 parts. The product was an oil that distilled in the range of 110° C. at 0.45 mm. to 180° C. at 2.5 mm. The product had a chlorine content of 26.0 to 26.6% (26.6% theoretical) and a molecular weight of 262 to 268 (267 theoretical). The product corresponded to bis(chloropentenoxy)ethane.

In a similar manner, there was prepared bis(bromopentenoxy)ethane.

*Example 2*

There was added to a reaction vessel 1400 parts of bis(chloromethoxy)propane, 250 parts of chloroform, 15 parts of anhydrous $CaCl_2$, and 110 parts of anhydrous zinc stearate. To this mixture there was added over a period of about four hours a total of 825 parts of butadiene, during which time the temperature of the system was maintained at 0 to 20° C. The mixture was then stirred for one hour at 20 to 30° C., after which it was washed twice with water, twice with aqueous 10% sodium carbonate, and once again with water. The mixture was stirred during the washing operation in order to assure best results. The product was dried over anhydrous magnesium sulfate, filtered, stripped, and distilled. The product was identified as bis(chloropentenoxy)propane. It distilled in the range of 85 to 175° C. at 0.8 mm., had a chlorine content of 23.6 to 25.1 (25.2% theoretical), and a molecular weight of 284 to 288 (281 theoretical).

Similarly, there was made bis(chloropentenoxy)hexane.

*Example 3*

To a reaction vessel there were added 1350 parts of bis(chloromethoxy)butane, 260 parts of ethylene dichloride, and 100 parts of anhydrous zinc chloride. Over a period of six hours there was added to this mixture 800 parts of butadiene, during which time the temperature of the system was kept at 10 to 25° C. The mixture was then stirred for one hour at 25 to 35° C., after which it was washed twice with water, twice with aqueous 10% sodium carbonate, and once more with water while the stirring was continued. The product was dried over anhydrous magnesium sulfate, filtered, stripped, and distilled. The product distilled in the range of 110 to 180° C. at 1.5 mm., had a chlorine content of 23.0 to 24.2% (24.1% theoretical) and corresponded to bis-(chloropentenoxy)butane.

*Exampwle 4*

There was added to a reaction vessel 1400 parts of bis(chloromethoxy)octane, 275 parts of chloroform, and 100 parts of anhydrous zinc stearate. Butadiene was introduced into this mixture over a period of five hours until 840 parts had been added. The temperature of the system was held at 5 to 20° C. during the butadiene addition. The mixture was then stirred for an hour at 20 to 30° C., after which it was washed twice with water, twice with aqueous 10% sodium carbonate, and once more with water. Stirring was continued during the washing operations. The product was dried over anhydrous magnesium sulfate, filteerd, stripped, and distilled. The product corresponded to bis(chloropentenoxy)octane.

Similarly, there were prepared bis(chloropentenoxy)-heptane and bis(bromopentenoxy)octane.

I claim:

1. As compositions of matter, compounds having the formula $(XCH_2CH=CHCH_2CH_2O)_2R$ in which R is an alkylene group of two to eight carbon atoms and X is a member of the class consisting of chlorine and bromine, the union between the oxygen atoms and said R group occurring at any two carbon atoms in said R group.

2. As compositions of matter, compounds having the formula $(ClCH_2CH=CHCH_2CH_2O)_2R$ in which R is an alkylene group of two to eight carbon atoms, the union between the oxygen atoms and said R group occurring at any two carbon atoms in said R group.

3. As compositions of matter, compounds having the formula $(BrCH_2CH=CHCH_2CH_2O)_2R$ in which R is an alkylene group of two to eight carbon atoms, the union between the oxygen atoms and said R group occurring at any two carbon atms in said R group.

4. As a composition of matter, the compound having the formula $ClCH_2CH=CHCH_2CH_2OCH_2$
$\phantom{ClCH_2CH=CHCH_2CH_2OC}CH_2OCH_2CH_2CH=CHCH_2Cl$ 5. As compositions of matter, bis(5-chloro-3-pentenoxy)propanes, the union between the oxygen atoms and the propane portion occurs at any two carbon atoms in said propane portion.

6. As compositions of matter, bis(5-chloro-3-pentenoxy)butanes, the union between the oxygen atoms and the butane portion occurs at any two carbon atoms in said butane portion.

References Cited in the file of this patent

UNITED STATES PATENTS

| | | |
|---|---|---|
| 2,075,312 | Straus | Mar. 30, 1937 |
| 2,524,778 | Dermer et al. | Oct. 10, 1950 |
| 2,624,753 | Emerson et al. | Jan. 6, 1953 |
| 2,653,173 | Niederhauser | Sept. 22, 1953 |